(12) United States Patent
Simon et al.

(10) Patent No.: US 12,740,669 B2
(45) Date of Patent: Sep. 22, 2026

(54) PELLET GRILL

(71) Applicant: WH PRODUCTS, LLC, Columbus, OH (US)

(72) Inventors: Paul J. Simon, Elizabethtown, KY (US); Michael R. Giebel, Joplin, MO (US); Xianjia Fan, Zhongshan (CN)

(73) Assignee: WH PRODUCTS, LLC, Columbus, OH (US)

( * ) Notice: Subject to any disclaimer, the term of this patent is extended or adjusted under 35 U.S.C. 154(b) by 1244 days.

(21) Appl. No.: 17/683,169

(22) Filed: Feb. 28, 2022

(65) Prior Publication Data

US 2022/0287504 A1 Sep. 15, 2022

Related U.S. Application Data

(60) Provisional application No. 63/161,230, filed on Mar. 15, 2021.

(51) Int. Cl.

| | |
|---|---|
| ***A47J 37/07*** | (2006.01) |
| ***A47J 36/24*** | (2006.01) |
| ***G01K 7/16*** | (2006.01) |

(52) U.S. Cl.

CPC ....... *A47J 37/0709* (2013.01); *A47J 36/2477* (2013.01); *A47J 37/0704* (2013.01); *A47J 37/0786* (2013.01); *G01K 7/16* (2013.01)

(58) Field of Classification Search

CPC .... A47J 37/0623; A47J 37/07; A47J 37/0704; A47J 37/0709; A47J 37/0786; A47J 37/079; A47J 37/0795; A47J 36/2477; G01K 7/16; G01K 2207/06

See application file for complete search history.

(56) References Cited

U.S. PATENT DOCUMENTS

| | | | | |
|---|---|---|---|---|
| 4,979,437 | A | 12/1990 | Giebel | |
| 2006/0086354 | A1* | 4/2006 | Kahler ................ | A47J 37/0786 126/25 R |
| 2012/0288596 | A1* | 11/2012 | Holdo Baggott ......... | A23L 5/15 426/235 |
| 2014/0261377 | A1* | 9/2014 | Chung .................. | A47J 45/085 126/25 R |
| 2022/0279965 | A1* | 9/2022 | Barry .................. | A47J 37/0786 |

* cited by examiner

*Primary Examiner* — Hung D Nguyen

(74) *Attorney, Agent, or Firm* — TUCKER ELLIS LLP

(57) ABSTRACT

A pellet fueled apparatus having a continuous spark ignition system and swing-away warming rack is disclosed. The apparatus may include a power supply controller configured to cause a spark generator to create a continuous spark in a gap space between two electrodes for a duration greater than 2 seconds and up to 20 minutes uninterrupted. The apparatus, when embodied as a grill may include a warming rack that swings away from an underlying cooking surface when the grill lid is opened.

18 Claims, 13 Drawing Sheets

10
260
502
504
506
508
200
264
270
286
12
510
210
284
280
500
110
274
266
402
400
404
328

PELLET GRILL

CROSS-REFERENCE TO RELATED APPLICATIONS

This application claims the benefit of U.S. Provisional Application No. 63/161,230 filed Mar. 15, 2021, the disclosure of which is hereby incorporated by reference herein in its entirety.

FIELD OF THE INVENTION

Embodiments of the present invention relate to food cooking appliances.

BACKGROUND OF THE INVENTION

Outdoor cooking, and particularly the use of outdoor barbecue grills, smokers, and griddles, remains very popular. A number of different appliances are currently available to cook food outdoors. Such appliances require some form of power and/or fuel to generate the heat required for cooking, or in some instances to power systems used to ignite and control the combustion of a given fuel. Over the years, the most popular power/fuel source has varied. Historically, popular heat/fuel sources have included electrical heating elements, wood logs and chips, charcoal briquettes, propane gas, natural gas, and more recently biomass pellets. References herein to a "pellet grill" are intended to include all barbecue grills, smokers, ovens, heaters, and griddles that use some form of pelletized (i.e., solid) fuel, whether or not such fuel is technically considered biomass fuel.

Biomass pellets have several advantages over other fuel sources for outdoor cooking. For one, biomass pellets are relatively easy and safe to transport and store. As compared with charcoal or wood, biomass pellets are also capable of providing a controlled burn rate and level of heat. Still further, biomass pellets may be manufactured to provide a particular "flavor" to the food as a result of combusting a pellet including a particular wood type. For example, a consumer may select hickory, maple, or cherry pellets, or a combination of pellet flavors, to impart a desired flavor to the cooked food.

Existing pellet grills, however, do have some disadvantages as currently designed. For example, existing pellet grills typically require a continuous supply of alternating current (AC) power limiting the use of the grill to locations with such power supplies. Thus, there is a need for a pellet grill that is untethered to a continuous supply of AC electrical power, such as a battery powered pellet grill.

In order to provide a truly portable and convenient pellet grill untethered to an AC power source, it may be advantageous to incorporate a direct current (DC) power source into the body of the grill. Accordingly, there is a need also for a pellet grill with an onboard battery system to supply electrical power.

It is also appreciated that a cooking session, or sessions, may exceed the capabilities of a single battery charge for a portable pellet grill. Accordingly, there is a need also for a pellet grill with an onboard battery system that permits easy exchange of a spent battery pack with a fully charged battery pack.

Traditional pellet grills employ a resistive heating element to ignite the biomass pellets. Such resistive heating elements require a nearly constant, or constant, supply of electrical power and may have power needs that exceed the capabilities of an economically priced battery system. Accordingly, there is a need also for a pellet grill that reduces the power required to ignite biomass pellets for a full cooking session, and to power a pellet grill in general.

Traditional pellet grills have been too heavy to truly be considered portable. Accordingly, there is a need also for a light weight pellet grill that can easily be transported between different grilling locations.

Traditional pellet grills also have been too large to truly be considered portable. Thus, there is a need also for a compact pellet grill that can readily be used on a table top surface.

A pellet grill sized to make it truly portable, necessarily may have a reduced cooking area. In order to supplement such a reduce cooking area, there is a need also for a compact pellet grill that includes a swing-away warming rack suited for use in a compact grill housing.

OBJECTS OF THE INVENTION

Accordingly, it is an object of some, but not necessarily all embodiments of the present invention to provide a pellet grill that is untethered to a continuous supply of AC electrical power.

It is also an object of some but not necessarily all embodiments of the present invention to provide a pellet grill with an onboard battery system to supply electrical power.

It is also an object of some but not necessarily all embodiments of the present invention to provide a pellet grill with an onboard battery system that permits easy exchange of a spent battery pack with a fully charged battery pack.

It is also an object of some but not necessarily all embodiments of the present invention to provide a pellet grill that reduces the power required to ignite biomass pellets for a full cooking session, and to power a pellet grill in general.

It is also an object of some but not necessarily all embodiments of the present invention to provide a light weight pellet grill that can easily be transported between different grilling locations.

It is also an object of some but not necessarily all embodiments of the present invention to provide a compact pellet grill that can readily be used on a table top surface.

It is another object of some, but not necessarily all embodiments of the present invention to provide a compact pellet grill that includes a swing-away warming rack suited for use in a compact grill housing.

SUMMARY OF EMBODIMENTS OF THE INVENTION

Responsive to the foregoing challenges, Applicant has developed an innovative pellet fueled apparatus, comprising: a head unit having a burn pot configured to receive solid pellet fuel; an electrical power supply provided on or with the head unit; an electrical ground provided on or with the head unit or the power supply; a power supply controller electrically connected to the power supply; a spark generator electrically connected to the power supply controller; a first electrode electrically connected to the spark generator, said first electrode having a first metallic tip extending into the burn pot; and a second electrode electrically connected to the electrical ground, said second electrode having a second metallic tip extending into the burn pot, wherein a gap space is provided between the first metallic tip and the second metallic tip, and wherein the power supply controller is configured to cause the spark generator to create a continuous spark in the gap space between the first metallic tip and the second metallic tip for a duration greater than 2 seconds.

Applicant has further developed an innovative pellet and solid fuel ignition system, comprising: an electrical power supply; an electrical ground provided on or with the electrical power supply; a spark generator operatively connected to the electrical power supply; a first electrode electrically connected to the spark generator, said first electrode having a first metallic tip configured to extend into a burn pot; and a second electrode electrically connected to the electrical ground, said second electrode having a second metallic tip configured to extend into the burn pot, wherein a gap space is provided between the first metallic tip and the second metallic tip, and wherein the ignition system is configured to cause the spark generator to create a continuous spark in the gap space between the first metallic tip and the second metallic tip for a duration greater than 2 seconds.

Applicant has further developed an innovative method of igniting solid fuel in a burn pot of a solid fuel grill, solid fuel oven, or solid fuel heater, comprising the steps of: providing a burn pot with solid fuel disposed therein; and creating a continuous spark in the burn pot for a duration of 1 to 15 minutes.

Applicant has still further developed an innovative solid fuel grill, solid fuel oven, or solid fuel heater, comprising: a head unit having a burn pot configured to receive solid fuel; a means for supplying electrical power provided on or with the head unit; an electrical ground provided on or with the head unit or the means for supplying electrical power; a means for controlling the supply of electrical power; a first electrode electrically connected to the means for supplying power, said first electrode having a first metallic tip extending into the burn pot; and a second electrode electrically connected to the electrical ground, said second electrode having a second metallic tip extending into the burn pot, wherein a gap space is provided between the first metallic tip and the second metallic tip, and wherein the means for controlling the supply of electrical power is adapted to cause the means for supplying electrical power to create a continuous spark in the gap space between the first metallic tip and the second metallic tip for a duration greater than 2 seconds.

Applicant has still further developed an innovative cooking grill, comprising: a head unit having a lid and a first outer side wall spaced from a second outer side wall, wherein the lid, the first outer side wall, and the second outer side wall define, in part, an interior portion of the head unit; an internal wall disposed in the interior portion of the head unit between the first outer side wall and the second outer side wall, wherein the first outer side wall is coplanar with a first reference plane and the internal wall is coplanar with a second reference plane; a lid side wall provided with the lid, wherein the lid side wall is disposed above the first outer side wall; a lid flange provided with the lid, wherein the lid flange is disposed above the internal wall; a warming rack disposed in the interior portion of the head unit between the first reference plane and the second reference plane, said warming rack having a first saddle piece having a U-shaped indent disposed proximal to the first reference plane, a second saddle piece having a U-shaped indent disposed proximal to the second reference plane, and a plurality of food supporting members disposed between the first saddle piece and the second saddle piece; a first U-shaped warming rack support having a central cross bar fixedly connected to the warming rack, said first U-shaped warming rack support further having first and second side arms extending away from the central cross bar, wherein the first side arm is moveably connected to the lid side wall and the second side arm is moveably connected to the lid flange; and a second U-shaped warming rack support having a central span threaded between the first saddle piece and the plurality of food supporting members, said second U-shaped warming rack support further having first and second side legs extending away from the central span, wherein the first side leg is moveably connected to the first outer wall and the second side leg is moveably connected to the internal wall.

Applicant has still further developed an innovative cooking grill, comprising: a grill body having a first grill body wall coplanar with a first reference plane spaced from a second grill body wall coplanar with a second reference plane; a lid having a first lid wall provided above the first grill body wall and a second lid wall provided above the second grill body wall, wherein said lid is connected to the grill body at the first grill body wall and the second grill body wall; a warming rack disposed between the first reference plane and the second reference plane; a U-shaped first warming rack support fixedly connected to the warming rack, said first warming rack support having a side arm moveably connected to the first lid wall or the second lid wall; and a second warming rack support moveably connected to the warming rack, said second warming rack support having a side leg moveably connected to the first grill body wall or the second grill body wall.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
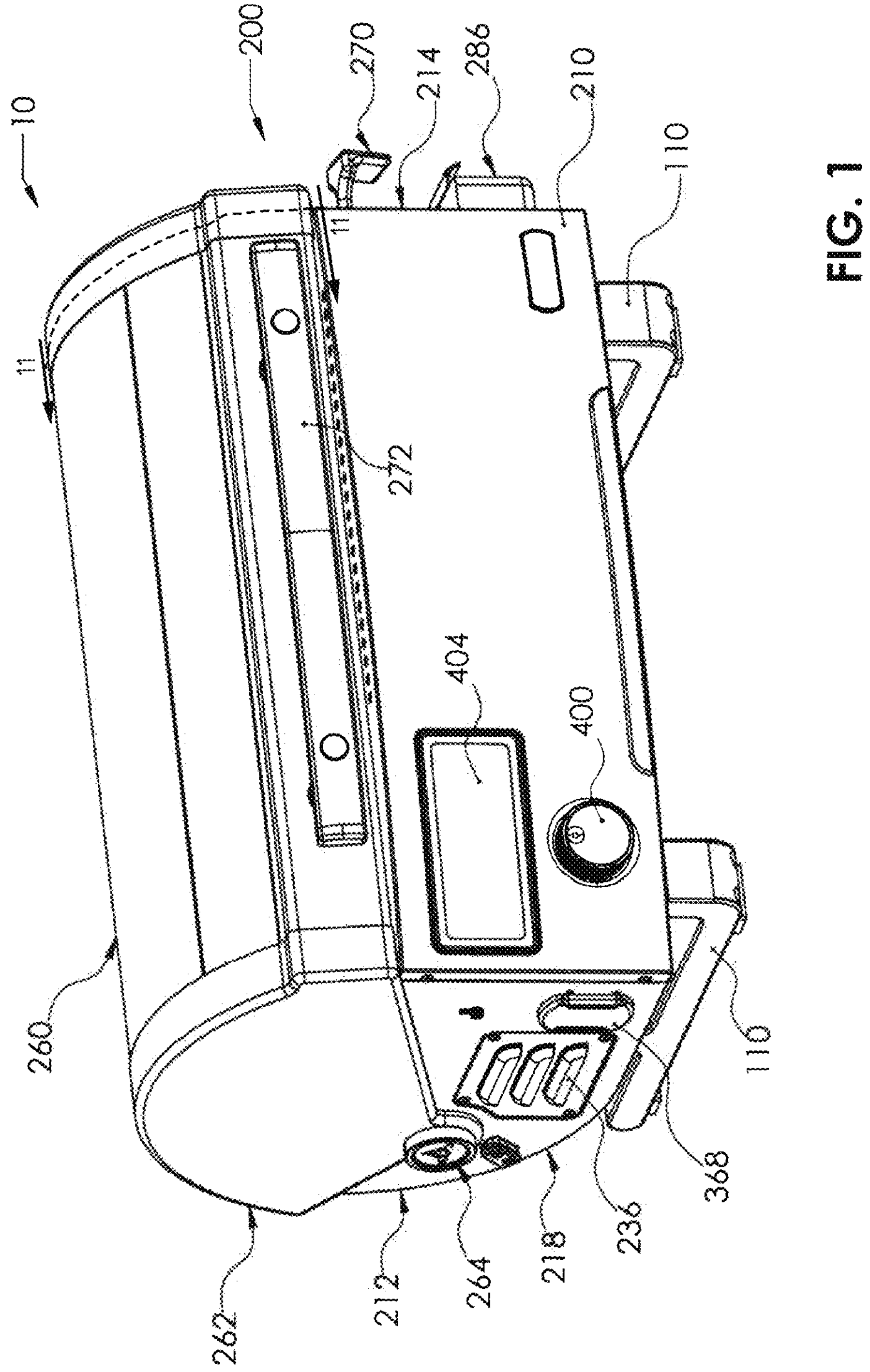
FIG. 1 is a perspective view of the front of a pellet grill in accordance with embodiments of the invention.

Reference will now be made in detail to embodiments of the present invention, examples of which are illustrated in the accompanying drawings. With reference to FIGS. 1-6, a pellet grill, or pellet oven, or pellet heater 10 (collectively referred to herein as a "pellet grill") may include grill feet 110 and an upper head unit 200. The size, shape, and design of the grill feet 110 may be varied without departing from the intended scope of the invention. For example, in alternative embodiments, the feet 110 may be replaced by an enclosed cabinet for storage and/or esthetic purposes. In the embodiment depicted in the figures, the grill feet 110 are sized to permit the pellet grill 10 to safely rest on top of a table or other elevated horizontal surface.

The head unit 200 may include a lower grill body 210 having a left side wall 212, and a right side wall 214, respectively. The head unit 200 may also include an upper rollback lid 260 having opposing lid sides 262 and a front contoured or bowed handle 272. The lid 260 is shown in a closed position in FIGS. 1-5. The lid 260 sides 262 may include lid side pivot point caps 264 that conceal a pivot assembly that moveably connects the lid 260 to the grill body 210. Each pivot assembly for the lid 260 may be located closer to the rounded rear wall 216 than to the front of the grill body 210 so that when opened, the lid not only swings upward, but also swings backward away from the grill body providing enhanced access to the cooking surface 280. A lid side end bracket (not shown) may receive a shaft (not shown) about which the lid 260 may pivot between open and closed positions. The lid side end bracket may be used to space the lid 260 from the grill body 210 so that the lid may pivot relatively freely about the shaft connecting it to the grill body. The pivot shaft may be retained in place by a washer/fastener assembly (not shown) driven into the shaft from the interior of the grill body 210. Alternative embodiments may include a pivot bearing disposed between the lid 260 and the shaft to further improve the pivoting motion. Preferably, the lid 260 may be configured to pivot through close to ninety (90) degrees of arc, or more preferably, more than ninety (90) degrees of arc in some embodiments.

Figure 2:
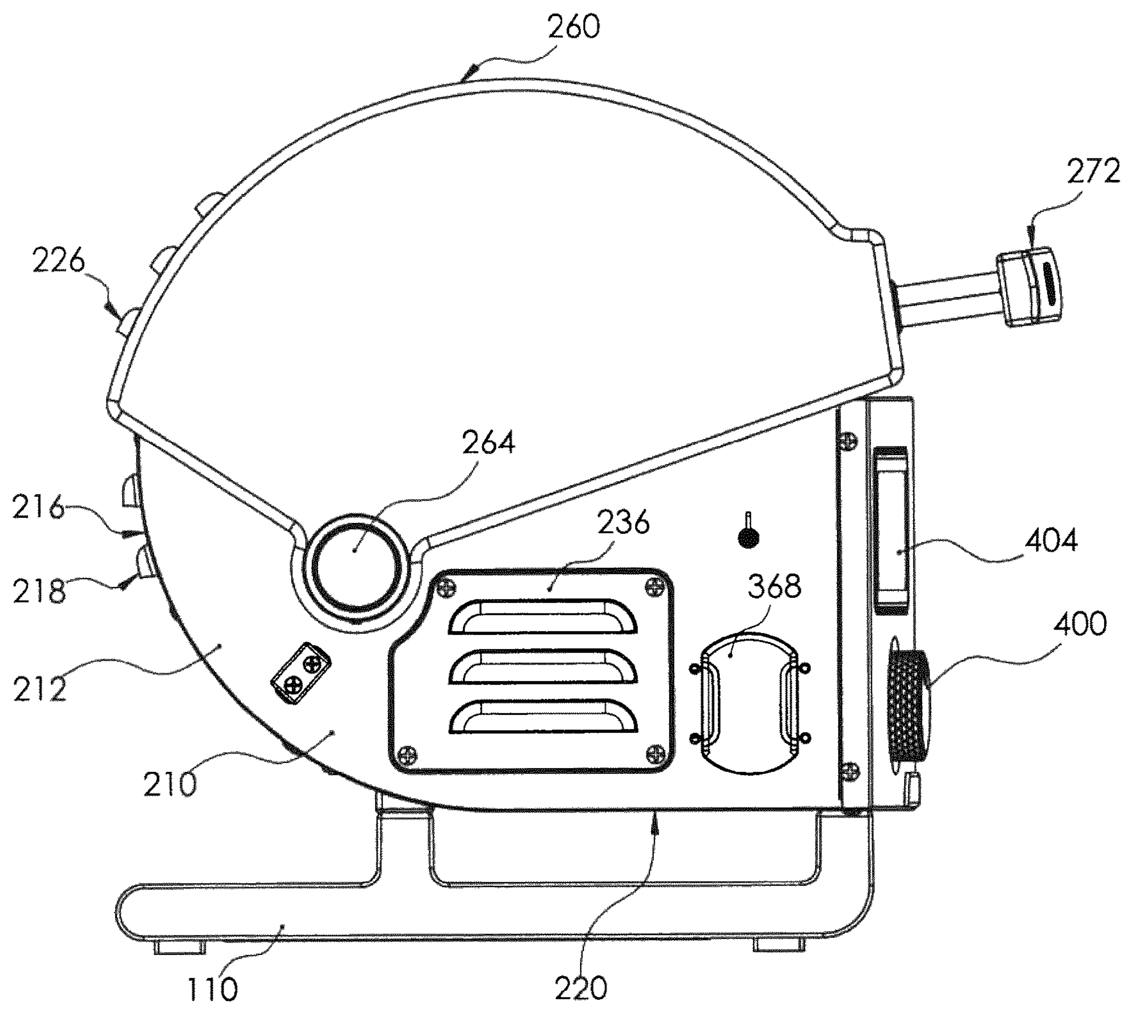
FIG. 2 is a left side view of a pellet grill in accordance with embodiments of the invention.
Figure 3:
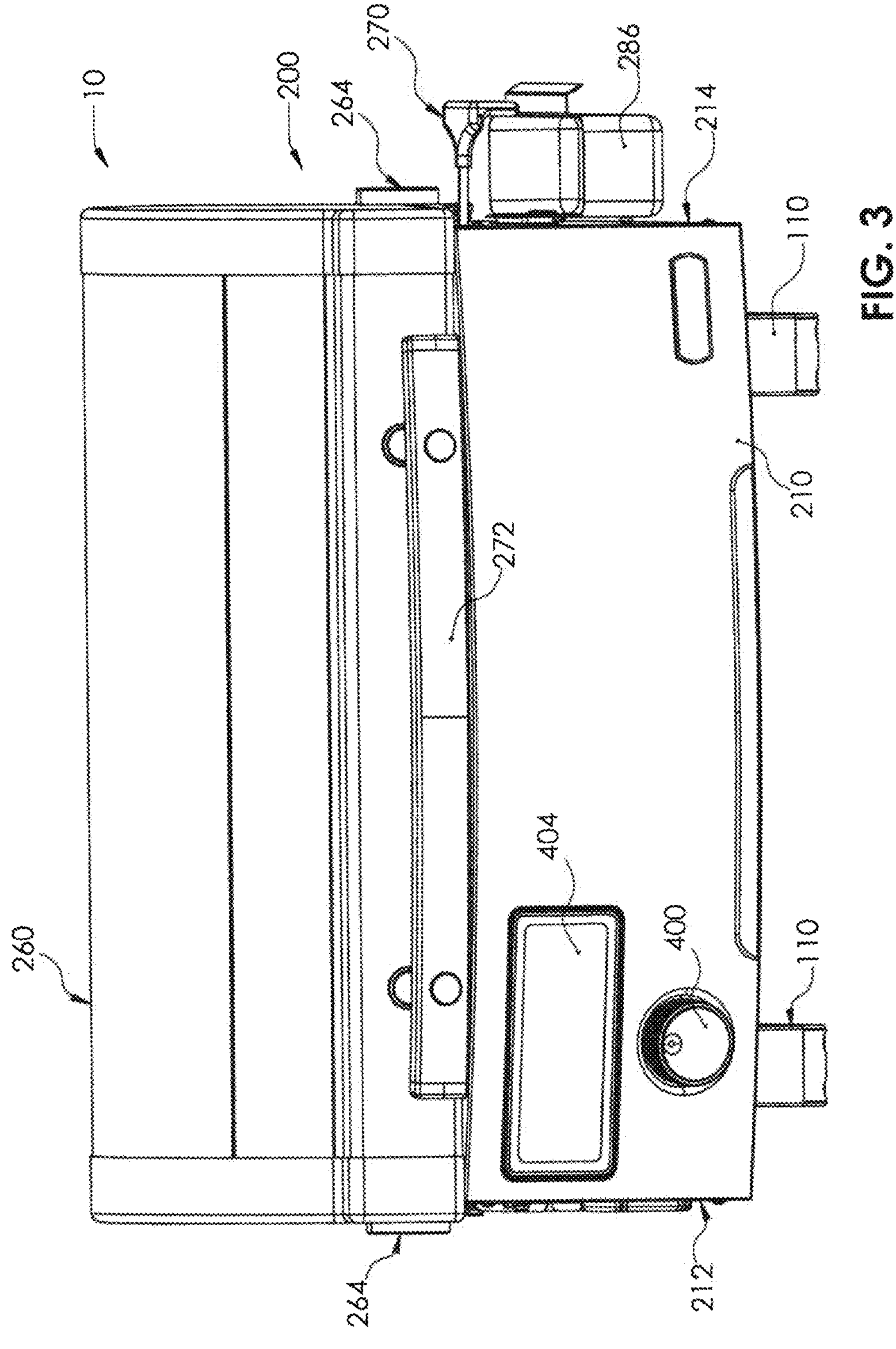
FIG. 3 is a front view of a pellet grill in accordance with embodiments of the invention.
Figure 4:
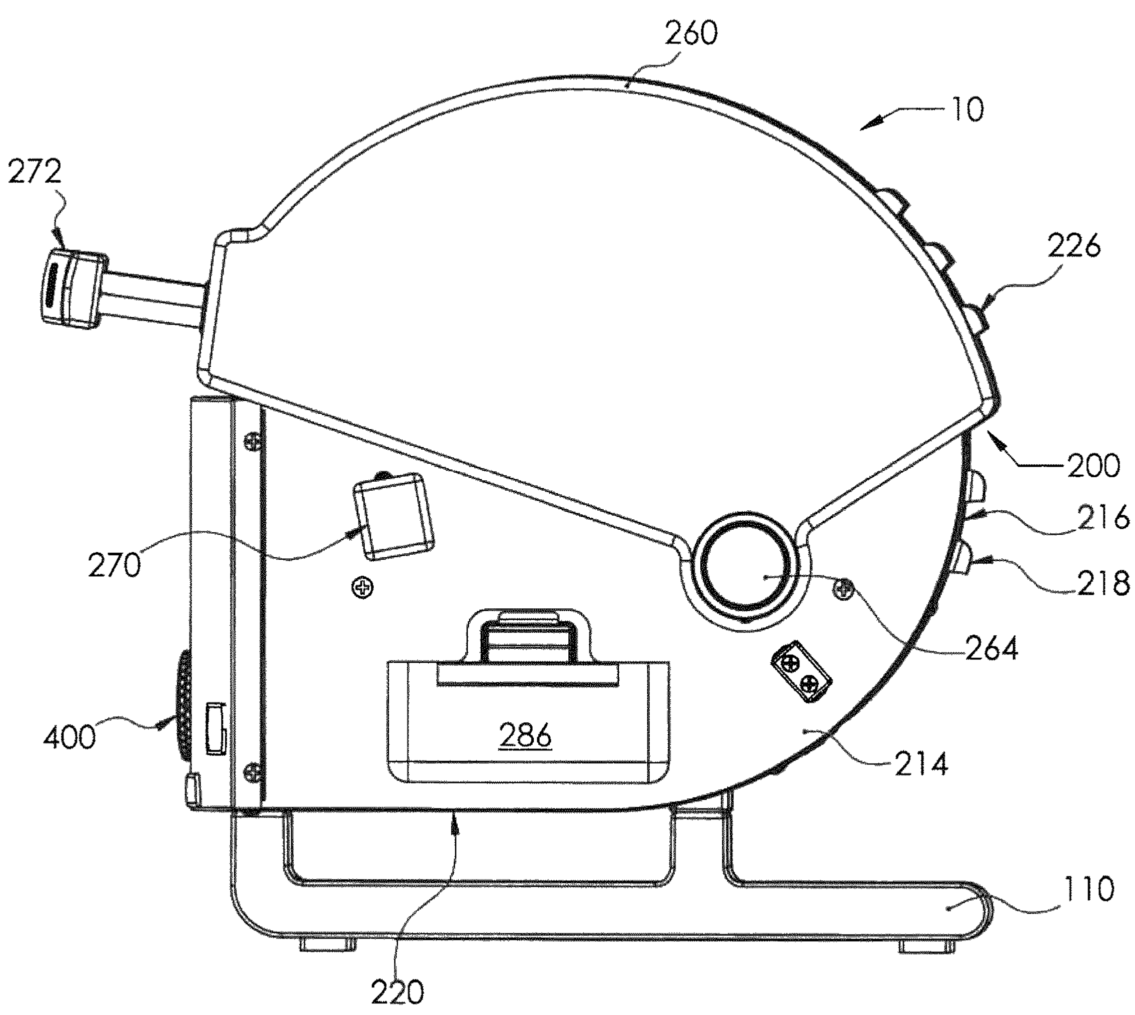
FIG. 4 is a right side view of a pellet grill in accordance with embodiments of the invention.
Figure 5:
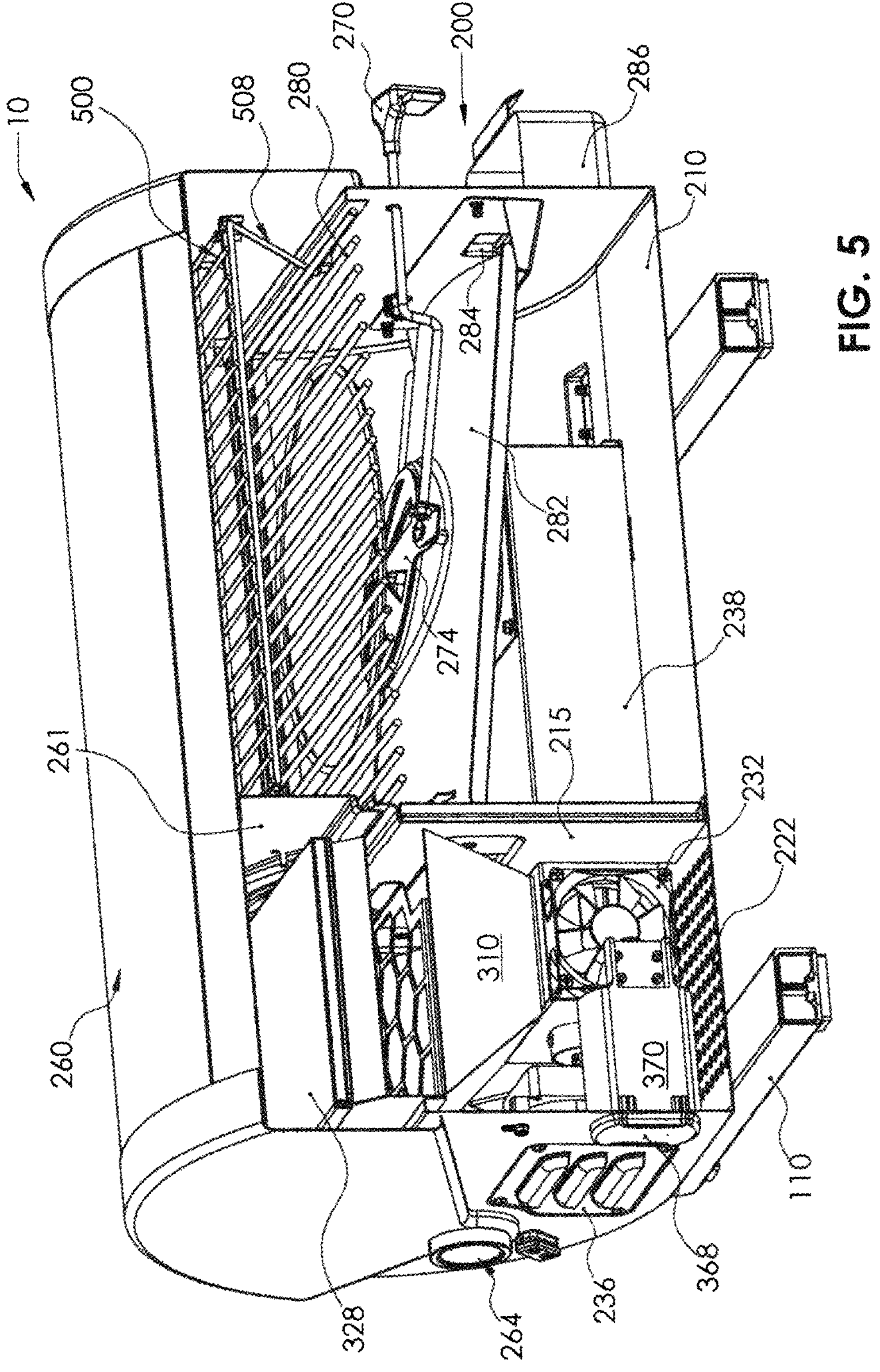
FIG. 5 is a cross-sectional front perspective view of a pellet grill in accordance with embodiments of the invention.

The head unit 200, and more particularly, the grill body 210, may include a temperature adjustment control knob 400 and an electrically powered readout panel/power supply controller 404. The readout panel may provide various information to a user, such as but not limited to a temperature information, an auger operation information, a fan operation information, meat probe information, continuous spark activity information, and a battery life information (see FIG. 13). With particular reference to FIGS. 1 and 2, the left side wall 212 of the grill body 210 may include fan intake vents 236 and a battery compartment cover 368. The rear wall 216 may include a plurality of body louver vents 218, and the lid 260 may include a plurality of similar lid vent openings 226. With particular reference to FIGS. 1, 2 and 5, the grill body bottom 220 may include a number of grill body bottom vents 222. With particular reference to FIGS. 1, 3 and 4, a flue handle 270 and a grease receptacle 286 may be provided at the right side wall 214 of the grill body 210.

With reference to FIGS. 5-9, the grill body 210 may include a pellet hopper 310 used to store solid pellet shaped fuel. The hopper 310 may taper inwardly from top to bottom to promote the flow of pellets in a downward direction under the influence of gravity. An example of the inward taper of the pellet hopper 310 is readily visible from FIG. 5. A hopper lid 328 may be provided at the top end of the hopper 310. The bottom end of the hopper 310 may be open so that fuel pellets may drop through a pellet feed tube 332 into an auger 340.

Figure 6:
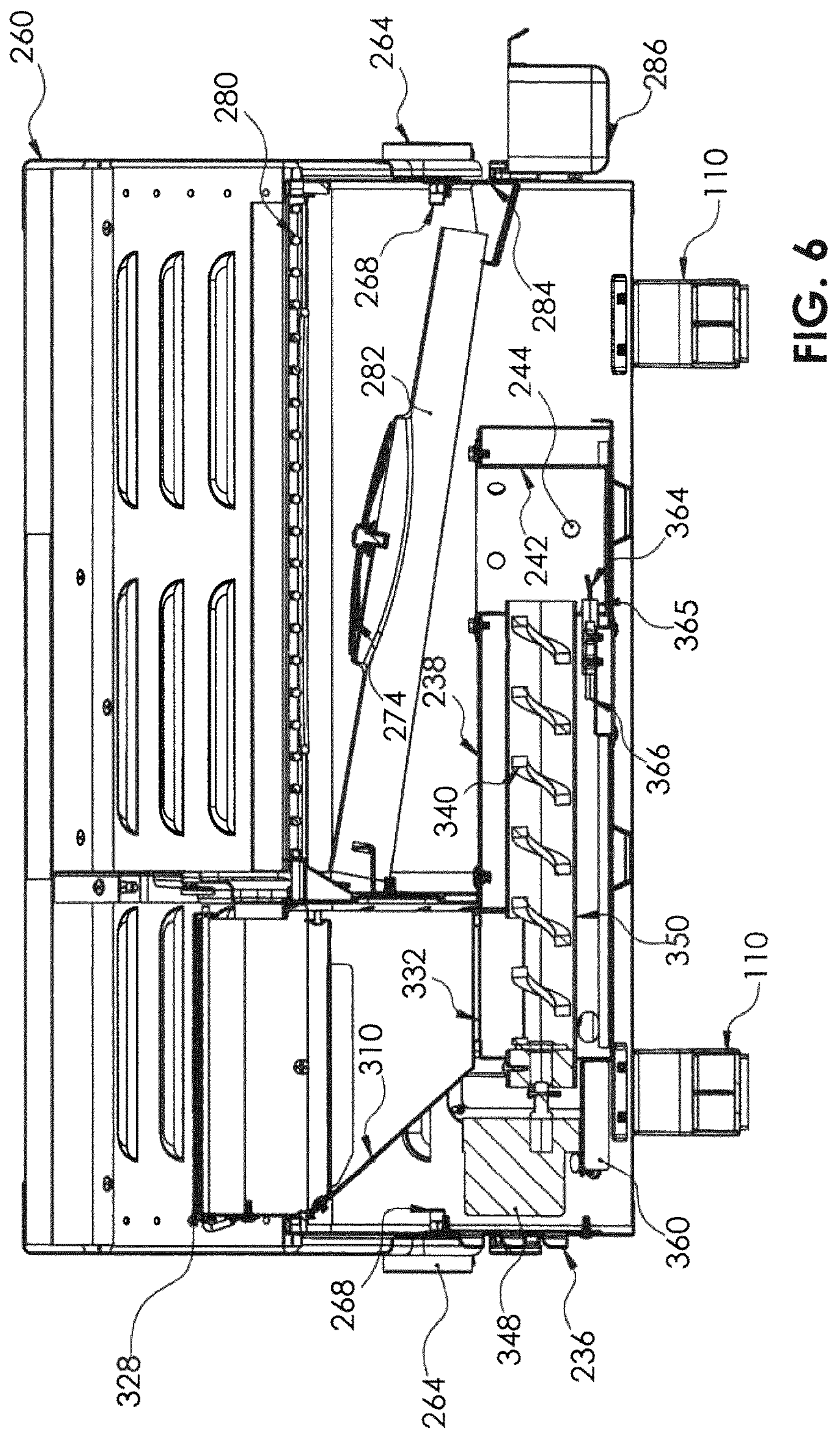
FIG. 6 is a cross-sectional front view of a pellet grill in accordance with embodiments of the invention.
Figure 7:
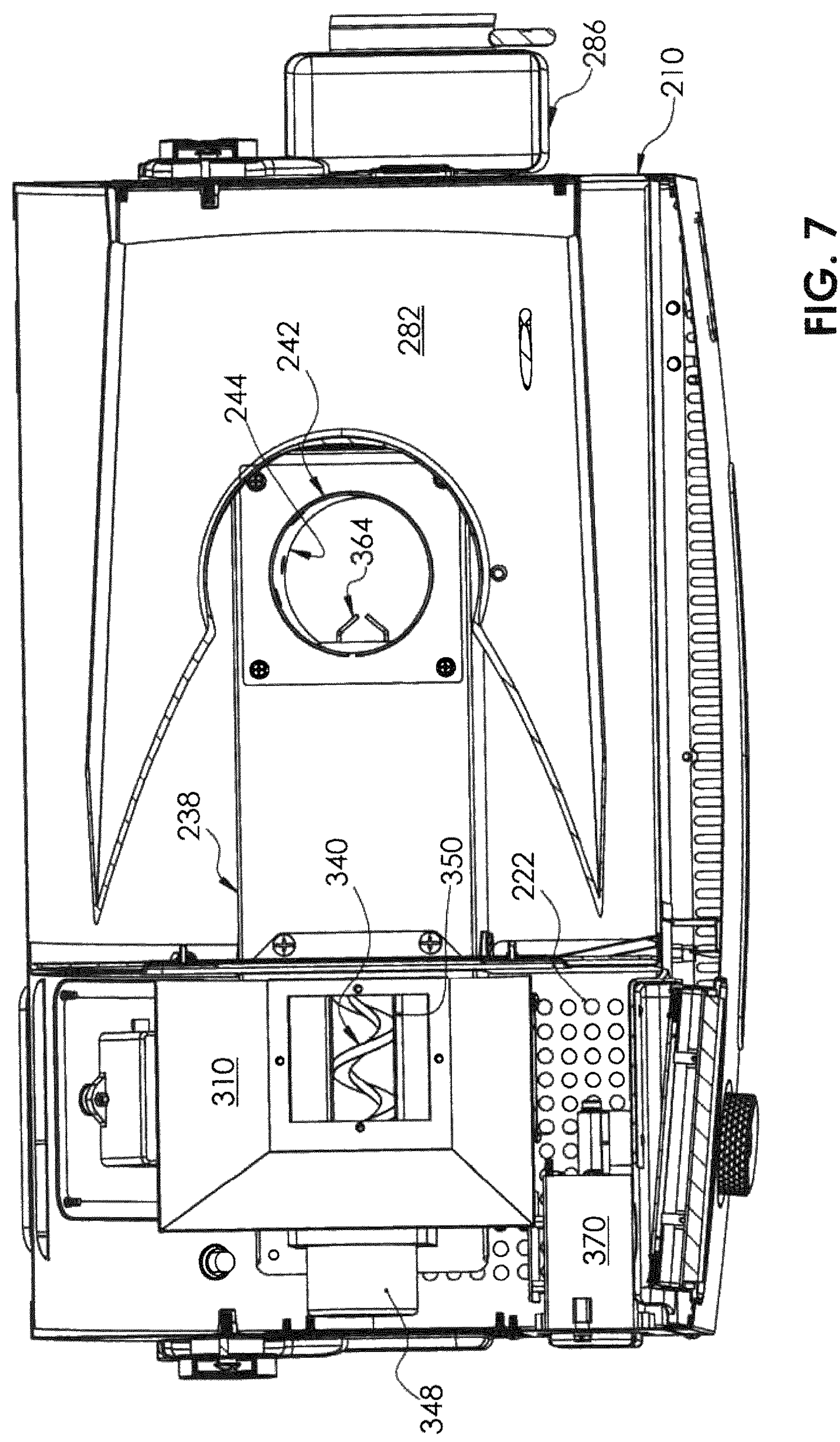
FIG. 7 is a cross-sectional top view of a pellet grill in accordance with embodiments of the invention.
Figure 10:
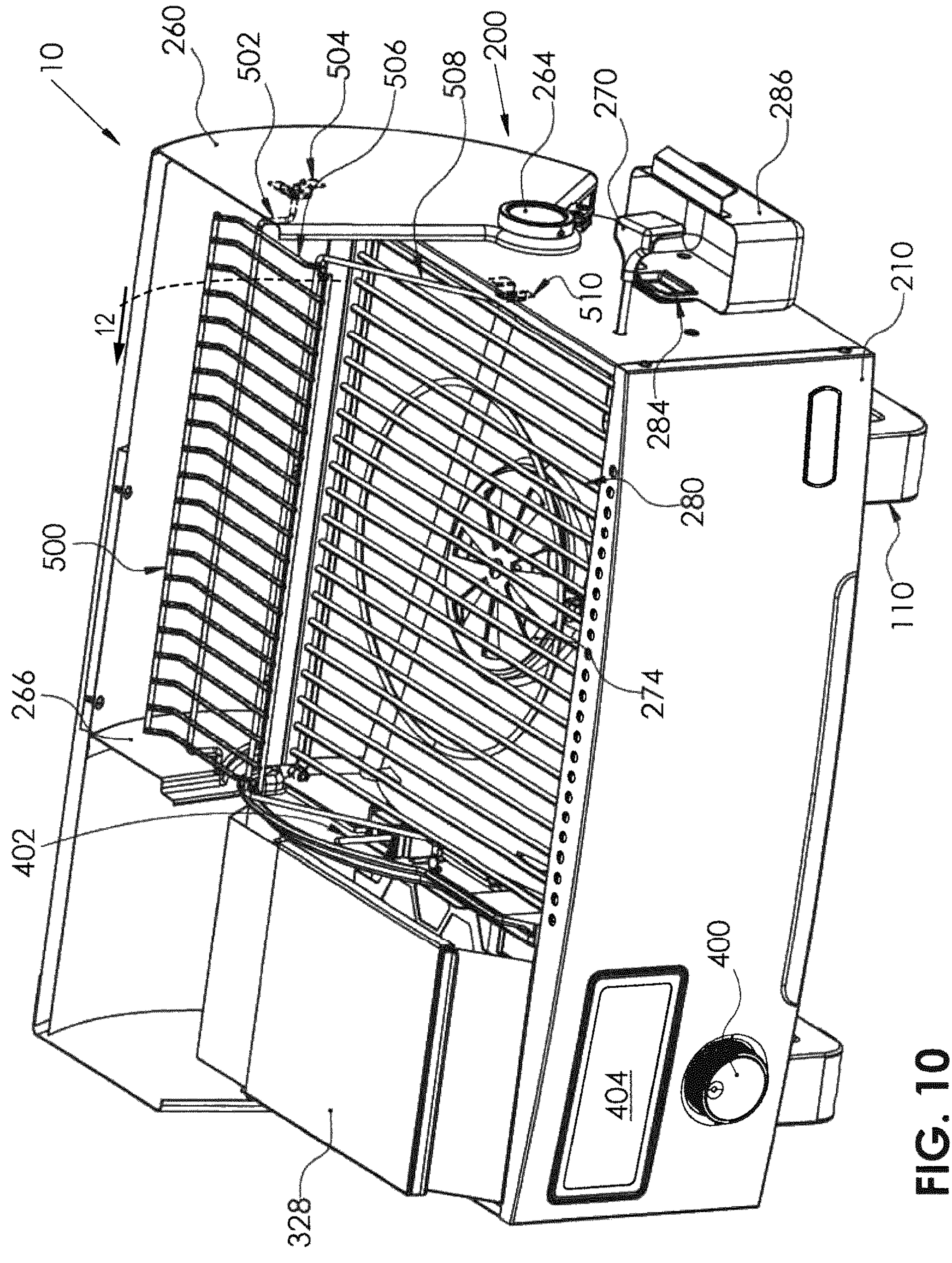
FIG. 10 is a perspective view of a pellet grill with an open lid in accordance with embodiments of the invention.
Figure 11:
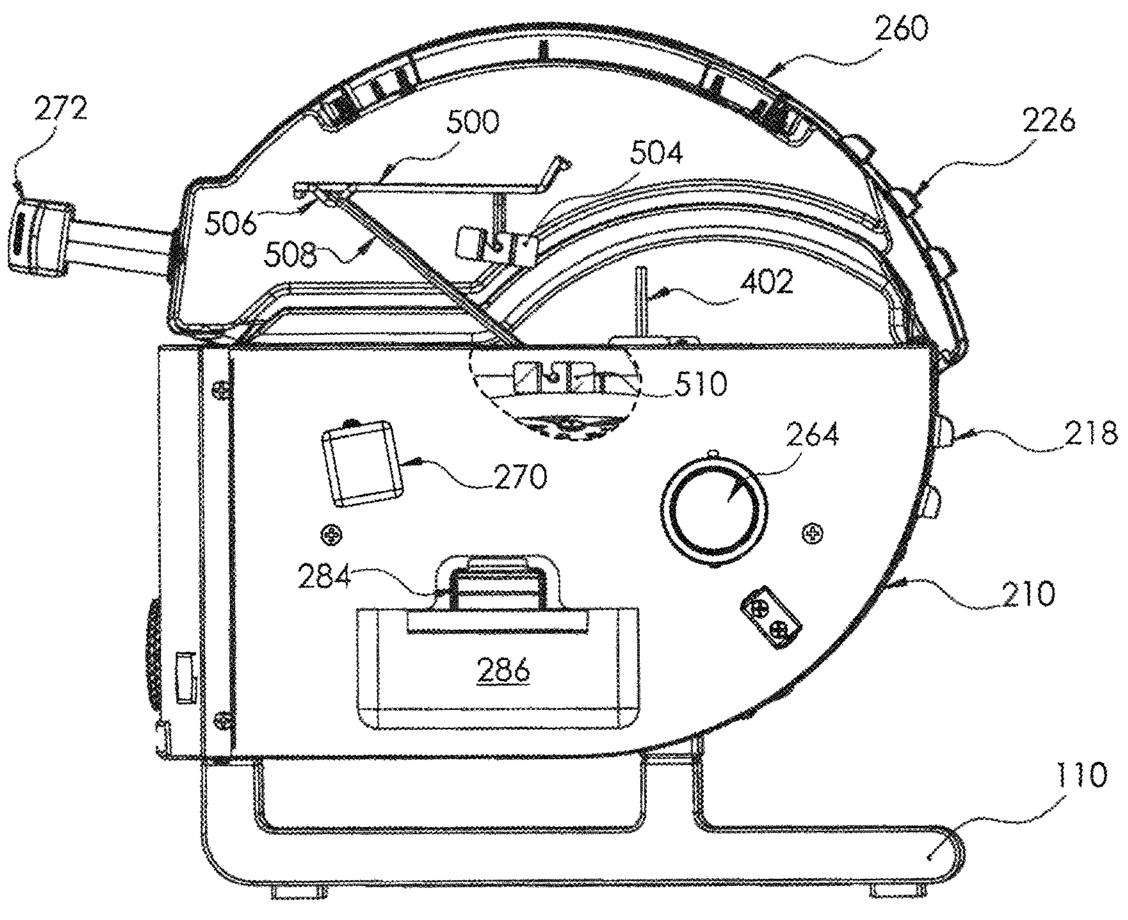
FIG. 11 is a cut-away right side view of a pellet grill with a closed lid in accordance with embodiments of the invention.
Figure 12:
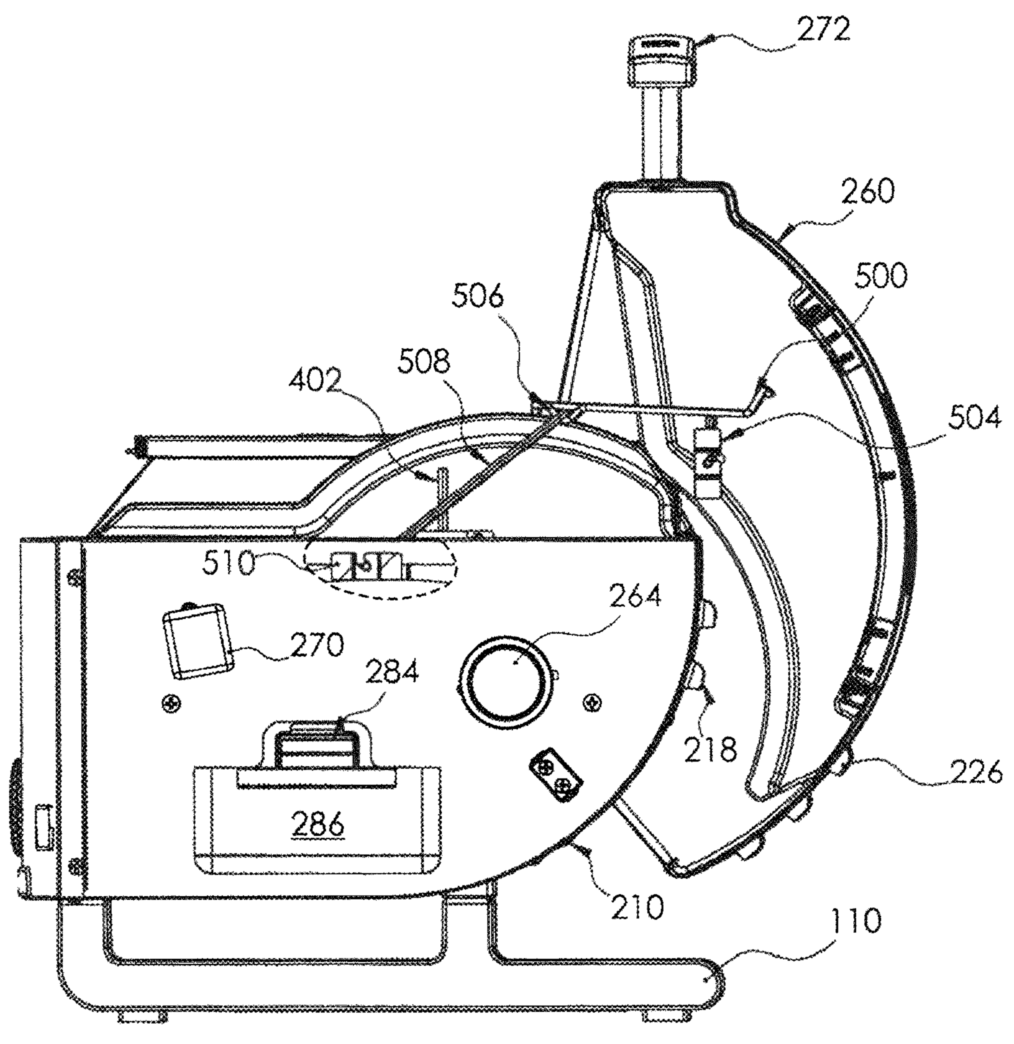
FIG. 12 is a cut-away right side view of a pellet grill with an open lid in accordance with embodiments of the invention.

With reference to FIGS. 6 and 7, the auger 340 may have a blade configured to convey pellets from the pellet feed tube 332 to a burn pot 242. The auger 340 may be supported by one or more auger bearings and be partially encased by an auger housing 350. An electrically powered auger motor 348 may drive the auger 340 at one or more predetermined speed(s) under the control of the power supply controller 404. In some embodiments, the auger motor 348 may run at a preset constant speed when the grill 10 is in operation based on a particular temperature set using the controller knob 400. In other embodiments, the auger motor 348 may drive the auger 340 at specified speeds to provide a desired amount of fuel based on measured temperatures in the cooking chamber (i.e., the area above the cooking surface 280) and/or measured temperatures in the heating chamber (i.e., the area below the cooking surface). Temperature measurements may be taken using one or more temperature sensors, such as a resistance temperature detector (RTD) 402 (shown in FIGS. 10-12) positioned as needed in the cooking chamber and/or the heating chamber.

With reference to FIGS. 5-9 and 13, the burn pot 242 also may be connected to a fan assembly 232 via an air passage 238. The fan assembly 232 may be used to draw air through the fan intake vents 236, bottom vents 222, and the body louver vents 218, and thereafter direct the air to the burn pot 242 via the air passage 238. The power supply controller 404 may be used to control the speed of the fan assembly 232, the speed of the auger 340, and/or the generation of continuous spark by the spark generator 360 to provide a selective level of pellet combustion and heat generation in the burn pot 242. The power supply controller 404 may use a feed-back loop including one or more of the RTDs 402 to provide a selected level of heat in the cooking chamber based on the setting of the temperature knob 400. For example, RTD readings indicating a rise in temperature of more than 20F in one minute may indicate ongoing combustion resulting in cessation of the continuous spark by the spark generator 360 under control of the power supply controller 404 and modulation of the fan speed and/or auger speed to maintain a desired temperature. Further, information provided from one or more meat probes 406 to the power supply controller 404 may be used to control spark generation, fan operation, and auger motor operation.

Figure 8:
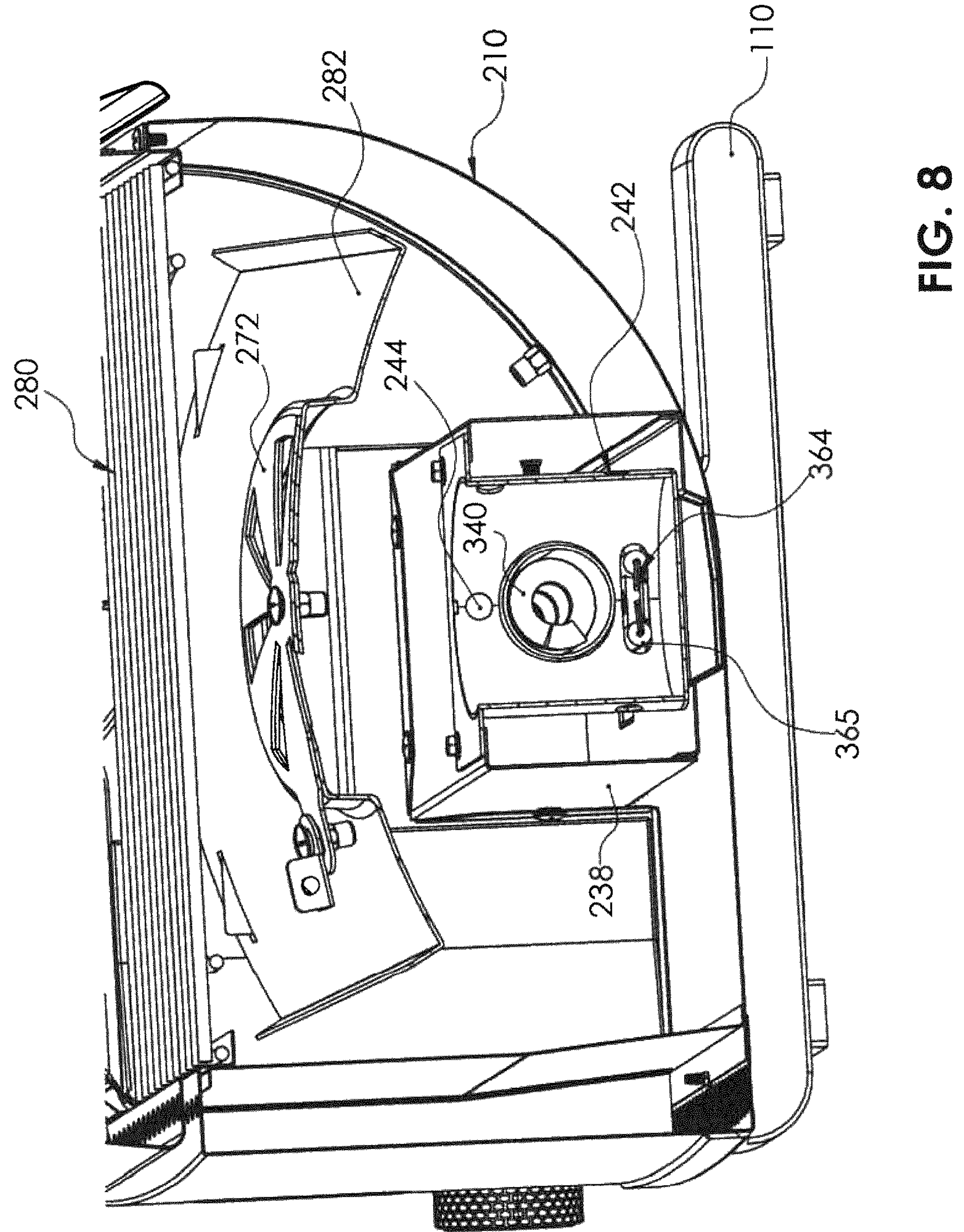
FIG. 8 is a cross-sectional right side perspective view of a pellet grill in accordance with embodiments of the invention.
Figure 9:
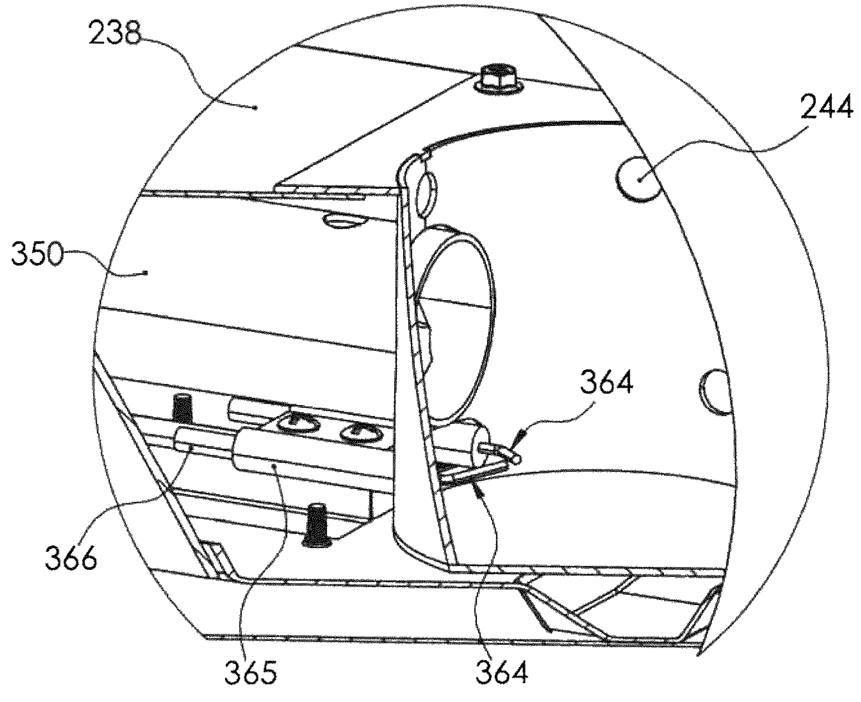
FIG. 9 is a cut-away perspective view of a pellet burn pot portion of a pellet grill in accordance with embodiments of the invention.

With continued reference to FIGS. 5-9, the auger 340 may extend through a side wall of the burn pot 242. The burn pot 242 may include a plurality of burn pot venting openings 244 that permit air to be blown into the burn pot from the fan assembly 232. A dual ignitor consisting of first and second electrodes 364 may extend through a slot provided in the wall of the burn pot 242 into the interior of the burn pot. The first and second electrodes 364 may each include a metallic tip extending away from a surrounding ceramic insulator 365. Each metallic tip may be comprised of a circular cross-sectional stiff solid wire made of nickel-chromium alloy having a diameter of 1 to 4 millimeters, and more preferably 1.5 to 3.5 millimeters. Each metallic tip may include a bend portion that directs the end of the metallic tip towards the other metallic tip in the pair as shown in FIGS. 7-9. The pair of metallic tips may be bent or otherwise separated by an air gap across which a discharge spark may be provided continuously to ignite pellets in the burn pot 242. Preferably the air gap may be 4 to 6 millimeters, or more preferably 4.5 to 5.5 millimeters. The electrodes 364 may be retained in place using a mounting plate that is secured to the bottom of the grill body 210 by screws or other fastening means. An electrical connector 366, such as conductive wire, may connect the electrodes 364 to a spark generator 360 that is in electrical communication with, and powered by, the battery 372 (see FIG. 13). Preferably, the spark generator 360 may be provided in close proximity to the battery 372. The spark generator 360 may include a booster coil and a Darlington transistor and have a power requirement of 12V/3A to provide a continuous spark. By "continuous" spark, it is meant to describe a spark that is not a "pulse" spark that jumps the air gap quickly and lasts less than 1 second, but instead a constant arc of spark lasting greater than 1 second, and in some instances lasting constantly for up to 15-20 minutes to create combustion of solid fuel. At grill start up, the spark generator 360 preferably creates a continuous spark for about 4 minutes or more to insure combustion.

With reference to FIGS. 5-8, the grill body 210 may surround a primary cooking surface 280. Additional cooking surfaces, including a warming rack 500, may be provided in the cooking chamber above the primary cooking surface. A bowed grease plate 282 may be disposed at an incline below the cooking surface 280. The central upward bow of the grease plate 282 may form two side channels to encourage the smooth flow of grease towards a grease drip port 284. Grease collected on the grease plate 282 flows downward through the grease drip port 284 and into a grease receptacle 286. Disposable liners may be provided for the grease receptacle.

The grease plate 282 may include central circular opening that may be selectively covered and uncovered by a flue gate 274. The opening of the flue gate 274 may be varied by adjusting the position of the flue handle 270 that may be connected to the flue gate via a rod extending therebetween. Manual adjustment of the flue gate 274 position may be used to control the burn rate of the solid fuel in the burn pot 242.

Figure 13:
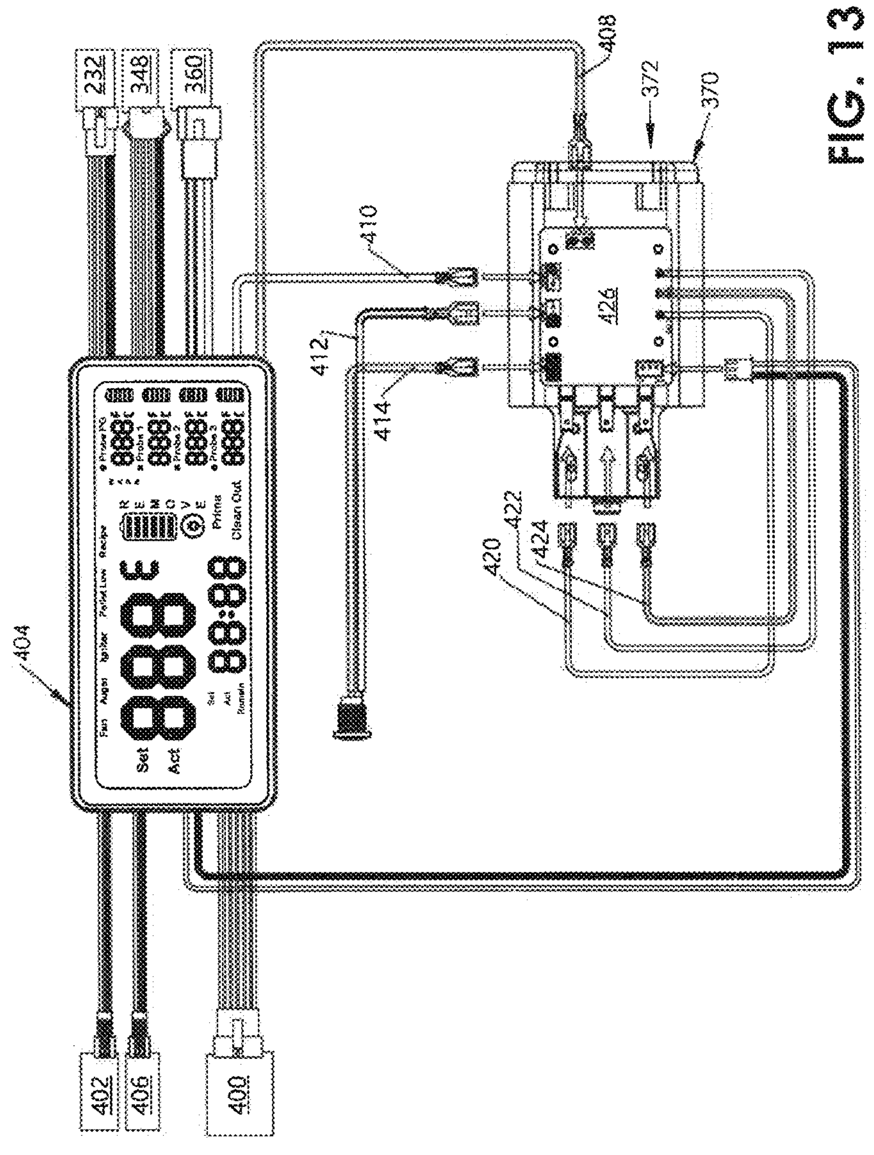
FIG. 13 is a schematic diagram of the pellet grill electrical system in accordance with embodiments of the invention.

With reference to FIG. 13, while the grill 10 may be powered by an alternating current (AC) power supply in some embodiments, in a preferred embodiment, the grill body 210 may include a battery compartment 370 which may receive a battery pack 372. The battery pack 372 may power all onboard electrical components of the grill 10, including without limitation, the readout panel/power supply controller 404, the temperature sensor 402, the meat probe 406, the fan assembly 232, the auger motor 348, and the spark generator 360. The battery pack 372 and battery compartment 370 may be electrically connected via a positive battery output (12V+) 420, a negative or ground battery output (12V−) 422, and a battery charge connection 424 to a distribution board 426. In turn, the distribution board 426 may be electrically connected to a main positive output (12V+) 408, a main negative or ground output (12V−) 410, an AC adapter negative or ground input (12V−) 412, and an AC adapter positive input (12V+) 414. The AC inputs 412 and 414 may be connected to an AC recharging receptacle adapted to connect to a conventional AC wall socket plug (not shown). In a preferred embodiment, the battery pack may include six (6) lithium-ion cells that provide 5 Ah/8A output at a maximum/12V. The battery pack 372 may be of sufficient amperage and/or wattage to provide up to 24 or more hours of grill operation in terms of power for the auger 340, the fan assembly 232, and the spark generator 360.

With reference to FIGS. 5 and 10-12, an internal wall 215 may disposed in the interior portion of the head unit 200 between the right side wall (214, FIG. 1) and the left side wall (212, FIG. 1) of the grill body 210, where the right side wall is coplanar with a first reference plane and the internal wall 215 is coplanar with a second reference plane. The lid 260 may include a side wall disposed above the right side wall of the grill body 210 and a lid flange 261 (with inner surface 266) extending downward from the lid so as to be disposed above the internal wall 215. As shown in FIG. 5, the lid flange 261 may include an inverted L-shaped portion provided along a lower edge that nests with and overlaps with a mating L-shaped portion provided along an upper edge of the internal wall 215. With reference to FIGS. 5 and 10-12, the lower edge of the lid flange 261 and the upper edge of the internal wall 215 may have mating rear curved portions that shield the hopper lid 328 from the cooking surface 280.

With continued reference to FIGS. 5 and 10-12, the grill 10 may include a warming rack 500 that is moveably connected to the grill body 210 and the lid 260 in an interior portion of the head unit 200. The warming rack 500 may be disposed in the interior portion of the head unit 200 between the first reference plane and the second reference plane. The warming rack 500 may have a first saddle piece 506 having a U-shaped indent disposed proximal to the first reference plane, a second saddle piece having a U-shaped indent disposed proximal to the second reference plane, and a plurality of food supporting members disposed between the first saddle piece and the second saddle piece. A back portion of the warming rack 500 may be fixedly connected (e.g., welded) to a first U-shaped warming rack support 502 that has a central cross bar separating opposing side arms spring fit into one or more first support brackets 504 mounted on the side wall of the lid 260 and the lid flange 261. The opposing side arms may move (e.g., rotate) relative to the lid 260 and lid flange 261. As a result of the fixed connection between the first U-shaped support 502 and the warming rack 500, the orientation of the first support relative to the warming rack is fixed throughout the opening motion of the lid 260. The warming rack 500 may be connected along a front portion to a second U-shaped warming rack support 508. The second U-shaped warming rack support 508 may have a central span threaded between the first saddle piece 506, the second saddle piece, and the plurality of food supporting members. The second U-shaped warming rack support 508 may further have first and second side legs extending away from the central span, wherein the first side leg is moveably connected to the right side wall (214, FIG. 1) and the second side leg is moveably connected to the internal wall 215. The opposing side legs may be spring fit into one or more second support brackets 510 mounted on the right side wall of the grill body 210 and the internal wall 215. The opposing side legs of the second support 508 may be several times the length of the opposing sides arms of the first support 502 (preferably 3-6 times the length, more preferably 4-5 times the length). The second support brackets 510 may be provided just below the cooking surface 280 at opposite ends thereof, near or at a midpoint between the front and back of the cooking surface. The U-shaped indents in the saddle pieces 506 may accommodate the central span of the second support 508 in a manner that permits the central span to rotate relative to the warming rack 500. As a result of the threading of the second support 508 through the saddle pieces 506, the orientation of the second support relative to the warming rack 500 varies by pivoting throughout the opening motion of the lid 260. As a consequence of the different connection types of the first and second supports 502 and 508 to the warming rack 500, the warming rack maintains a level position throughout the opening motion of the lid 260.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. For example, while the continuous spark ignition system is described in connection with a pellet grill head unit, it is appreciated that solid fuel or pellet fuel grill, oven, griddle, and heater embodiments of the invention are to be included in the scope of the appended claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What we claim is:

1. A cooking grill, comprising:

a head unit having a lid and a first outer side wall spaced from a second outer side wall, wherein the lid, the first outer side wall, and the second outer side wall define, in part, an interior portion of the head unit;

an internal wall disposed in the interior portion of the head unit between the first outer side wall and the second outer side wall, wherein the first outer side wall is coplanar with a first reference plane and the internal wall is coplanar with a second reference plane;

a lid side wall provided with the lid, wherein the lid side wall is disposed above the first outer side wall;

a lid flange provided with the lid, wherein the lid flange is disposed above the internal wall;

a warming rack disposed in the interior portion of the head unit between the first reference plane and the second reference plane, said warming rack having a first saddle piece having a U-shaped indent disposed proximal to the first reference plane, a second saddle piece having a U-shaped indent disposed proximal to the second reference plane, and a plurality of food supporting members disposed between the first saddle piece and the second saddle piece;

a first U-shaped warming rack support having a central cross bar fixedly connected to the warming rack, said first U-shaped warming rack support further having first and second side arms extending away from the central cross bar, wherein the first side arm is moveably connected to the lid side wall and the second side arm is moveably connected to the lid flange; and a second U-shaped warming rack support having a central span threaded between the first saddle piece and the plurality of food supporting members, said second U-shaped warming rack support further having first and second side legs extending away from the central span, wherein the first side leg is moveably connected to the first outer wall and the second side leg is moveably connected to the internal wall.

2. The cooking grill of claim 1 wherein the internal wall includes an L-shaped portion provided along an upper edge.

3. The cooking grill of claim 2 wherein the lid flange includes an inverted L-shaped portion provided along a lower edge that overlaps with the L-shaped portion provided along the upper edge of the internal wall.

4. The cooking grill of claim 1 wherein the side legs are between 3 to 6 times the length of the side arms.

5. The cooking grill of claim 1 wherein a lower edge of the lid flange and an upper edge of the internal wall have mating rear curved portions.

6. The cooking grill of claim 1 wherein the first U-shaped warming rack support central cross bar is welded to the warming rack.

7. A cooking grill, comprising:

a grill body having a first grill body wall coplanar with a first reference plane spaced from a second grill body wall coplanar with a second reference plane;

a lid having a first lid wall provided above the first grill body wall and a second lid wall provided above the second grill body wall, wherein said lid is connected to the grill body at the first grill body wall and the second grill body wall;

a warming rack disposed between the first reference plane and the second reference plane;

a U-shaped first warming rack support fixedly connected to the warming rack, said first warming rack support having a side arm moveably connected to the first lid wall or the second lid wall; and a second warming rack support moveably connected to the warming rack, said second warming rack support having a side leg moveably connected to the first grill body wall or the second grill body wall wherein the side leg is between 3 to 6 times the length of the side arm.

8. The cooking grill of claim 7 wherein the warming rack includes a saddle piece having a U-shaped indent disposed proximal to the first reference plane or second reference plane.

9. The cooking grill of claim 8 further comprising an internal lid flange, wherein the first warming rack support is connected to the internal lid flange.

10. The cooking grill of claim 9 wherein the second warming rack support is U-shaped.

11. The cooking grill of claim 10, wherein the grill body further includes an internal wall disposed between the first outer side wall and the second outer side wall.

12. The cooking grill of claim 11, further comprising a lid flange provided with the lid, wherein the lid flange is disposed above the internal wall.

13. The cooking grill of claim 7 wherein the tower edge of internal wall, and the lid flange have overlapping and mating portions.

14. The cooking grill of claim 7 further comprising an internal lid flange, wherein the first warming rack support is connected to the internal lid flange.

15. The cooking grill of claim 14 wherein a lower edge of the internal lid flange, and an internal wall disposed between the first outer side wall and the second outer side wall, have overlapping mating portions.

16. The cooking grill of claim 7 wherein the second warming rack support is U-shaped.

17. The cooking grill of claim 7, wherein the grill body further includes an internal wall disposed between the first outer side wall and the second outer side wall.

18. The cooking grill of claim 7, further comprising an internal lid flange provided with the lid, wherein the lid flange is disposed above the internal wall.

* * * * *